US006786701B1

(12) United States Patent
Huang et al.

(10) Patent No.: US 6,786,701 B1
(45) Date of Patent: Sep. 7, 2004

(54) HIGH-PRESSURE MISTING FAN

(75) Inventors: Xian Huang, Olathe, KS (US);
Richard Evers, Overland Park, KS (US)

(73) Assignee: Emerson Electric Co., St. Louis, MO (US)

( * ) Notice: Subject to any disclaimer, the term of this patent is extended or adjusted under 35 U.S.C. 154(b) by 0 days.

(21) Appl. No.: 10/159,717

(22) Filed: May 31, 2002

(51) Int. Cl.[7] .............................................. F04B 23/08
(52) U.S. Cl. ............................... 417/199.1; 417/423.1; 417/247; 62/304; 62/259.4; 239/77
(58) Field of Search ........................... 417/199.1, 85, 417/423.1, 65, 247, 405; 62/304, 314, 259.4, 259.3; 239/77; 261/115, 116

(56) References Cited

U.S. PATENT DOCUMENTS

| | | | | | |
|---|---|---|---|---|---|
| 2,589,942 | A | * | 3/1952 | Hruby, Jr. | 239/382 |
| 2,635,920 | A | * | 4/1953 | Boyce | 239/77 |
| 3,868,835 | A | * | 3/1975 | Todd-Reeve | 68/20 |
| 6,212,897 | B1 | * | 4/2001 | Wang | 62/314 |
| 6,257,501 | B1 | * | 7/2001 | Roach et al. | 239/289 |
| 6,272,874 | B1 | * | 8/2001 | Keeney | 62/259.4 |
| 6,324,862 | B1 | * | 12/2001 | Monjes | 62/309 |
| 6,367,278 | B1 | * | 4/2002 | Strussion et al. | 62/314 |
| 6,471,194 | B2 | * | 10/2002 | Keeney | 261/30 |
| 6,543,247 | B2 | * | 4/2003 | Strauss | 62/259.3 |

* cited by examiner

*Primary Examiner*—Justine R. Yu
*Assistant Examiner*—Michael K. Gray
(74) *Attorney, Agent, or Firm*—Hovey Williams LLP

(57) ABSTRACT

A high pressure misting fan (10) configured for injecting a fluid (F) into a generated stream of air to produce a cooling vapor impregnated airstream (V) is disclosed. The fan (10) broadly includes a rotatable propeller (12), a motor (14), a pump (16), and a nozzle assembly (18). The propeller (12) is drivingly connected to the motor (14) and generates the airstream when rotated by the motor (14). The motor (14) is drivingly connected to both the propeller (12) and to the pump (16) so that the motor (14) rotates the propeller (12) and operates the pump (16). In a preferred embodiment, the propeller (12) and the pump (16) are drivingly connected to opposite ends (32,34) of a common drive shaft (30). The pump (16) is fluidly disposed upstream from the nozzle assembly (18) and is operable to pressurize the fluid (F) flowing from the fluid source to the nozzle assembly (18). The nozzle assembly (18) is positioned downstream of the propeller (12) and is operable to inject pressurized fluid (F) into the airstream generated by the propeller (12) to result in the vapor-impregnated airstream (V).

14 Claims, 4 Drawing Sheets

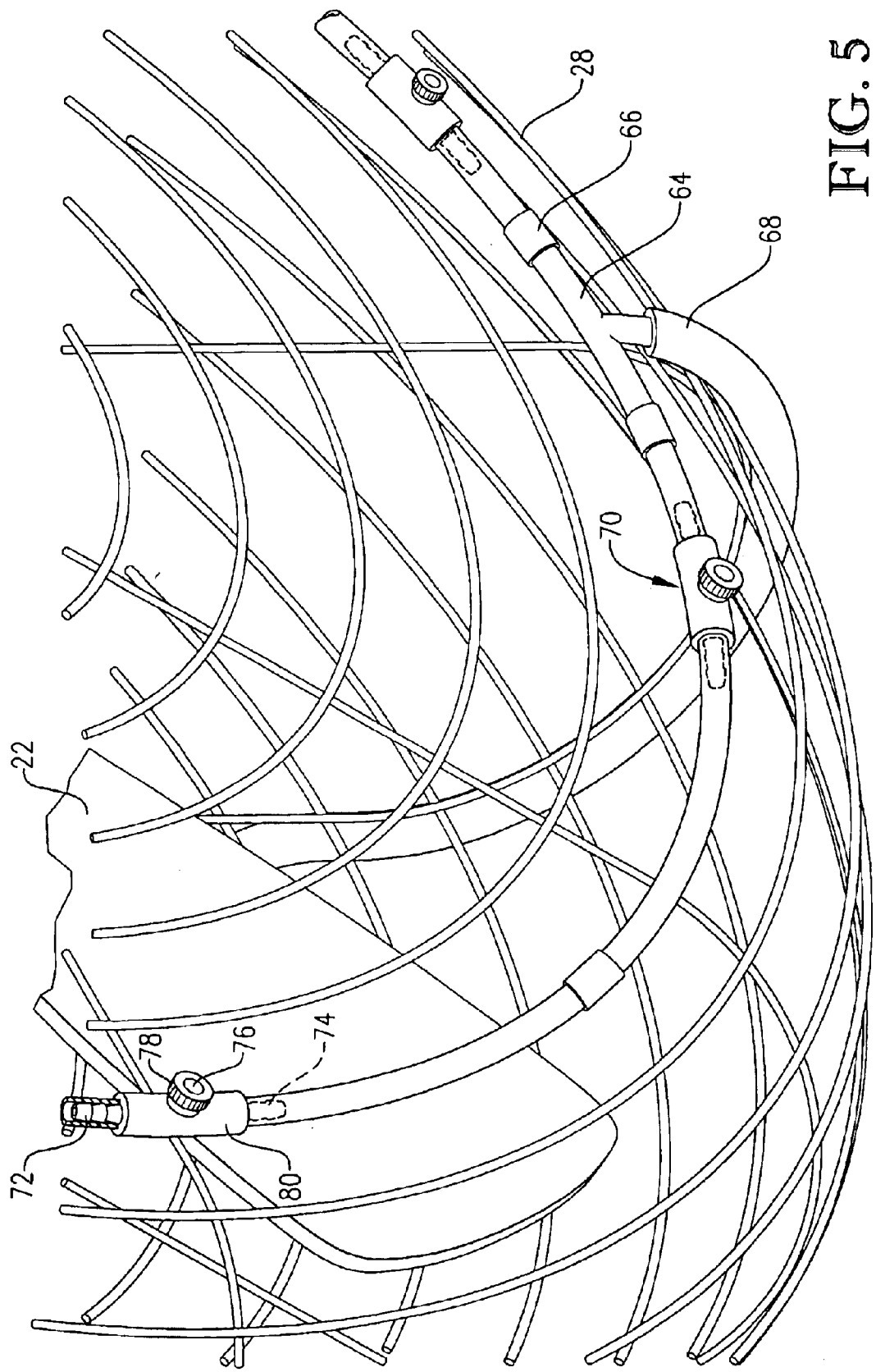

HIGH-PRESSURE MISTING FAN

BACKGROUND OF THE INVENTION

1. Field of the Invention

The present invention relates generally to equipment for cooling the ambient environment. More specifically, the present invention concerns a high-pressure misting fan that utilizes a propeller and a pump that are driven by a universal power source to provide effective and efficient evaporative cooling with a fan that is relatively inexpensive to both manufacture and maintain.

2. Description of the Prior Art

In many industrial and household settings, it is desirable to cool the ambient environment to facilitate the comfort of the people located therein. It is known in the art to utilize traditional air circulators as a means of cooling the ambient enviromnent and the people located therein. However, it is often desirable to provide a degree of cooling that is not obtainable by traditional air circulators alone.

Evaporative cooling systems utilizing a fluid source in combination with a powered propeller are known in the art. For example, it is known in the art to use a powered propeller to draw an airstream through a water-soaked filter. Additionally, it is known in the art to utilize a separate, stand-alone pumping system to supply fluid to augment the cooling provided by a separate air circulator. However, these prior art cooling systems are problematic and subject to several undesirable limitations. For example, prior art evaporative cooling systems are relatively complex in configuration, rendering them relatively expensive to manufacture and maintain. Additionally, prior art evaporative cooling systems are relatively bulky, requiring undesirable amounts of storage space and/or presenting hazardous obstacles to the work environment.

SUMMARY OF THE INVENTION

The principles of the present invention provide an improved evaporative cooling system that does not suffer from the problems and limitations of the prior art cooling systems described above. The improved cooling system provides a high-pressure misting fan that utilizes a propeller and a pump that are driven by a universal power source. The inventive configuration is relatively inexpensive to manufacture and maintain, yet provides efficient and effective evaporative cooling.

A first aspect of the present invention concerns a fan that broadly includes a rotatable propeller, a nozzle assembly, a pump, and a single motor. The propeller generates an airstream when rotated. The nozzle assembly is fluidly connectable to a fluid source and operable to inject fluid into the airstream. The pump is fluidly disposed upstream from the nozzle assembly and is operable to pressurize fluid flowing from the fluid source to the nozzle assembly. The single motor is drivingly connected to the propeller and the pump so that the single motor rotates the propeller and operates the pump.

A second aspect of the present invention concerns a fan that broadly includes a rotatable propeller, a nozzle assembly, a pump, and a motor. The propeller generates an airstream when rotated. The nozzle assembly is fluidly connectable to a fluid source and is operable to inject fluid into the airstream. The pump is fluidly disposed upstream from the nozzle assembly and is operable to pressurize fluid flowing from the fluid source to the nozzle assembly. The motor includes a rotatable drive shaft presenting first and second ends. The first end of the drive shaft is drivingly connected to the propeller and the second end of the drive shaft is drivingly connected to the pump.

A third aspect of the present invention concerns a method of injecting a fluid into the airstream generated by the propeller of a fan. The fluid injection method broadly including the steps of pressurizing the fluid with a pump, and driving the propeller and the pump by a common motor.

Other aspects and advantages of the present invention will be apparent from the following detailed description of the preferred embodiments and the accompanying drawing figures.

BRIEF DESCRIPTION OF THE DRAWING FIGURES

Preferred embodiments of the present invention are described in detail below with reference to the attached drawing figures, wherein:

FIG. 5 is an enlarged fragmentary view of the fan illustrating the nozzle assembly.

DETAILED DESCRIPTION OF THE PREFERRED EMBODIMENTS

Figure 1:
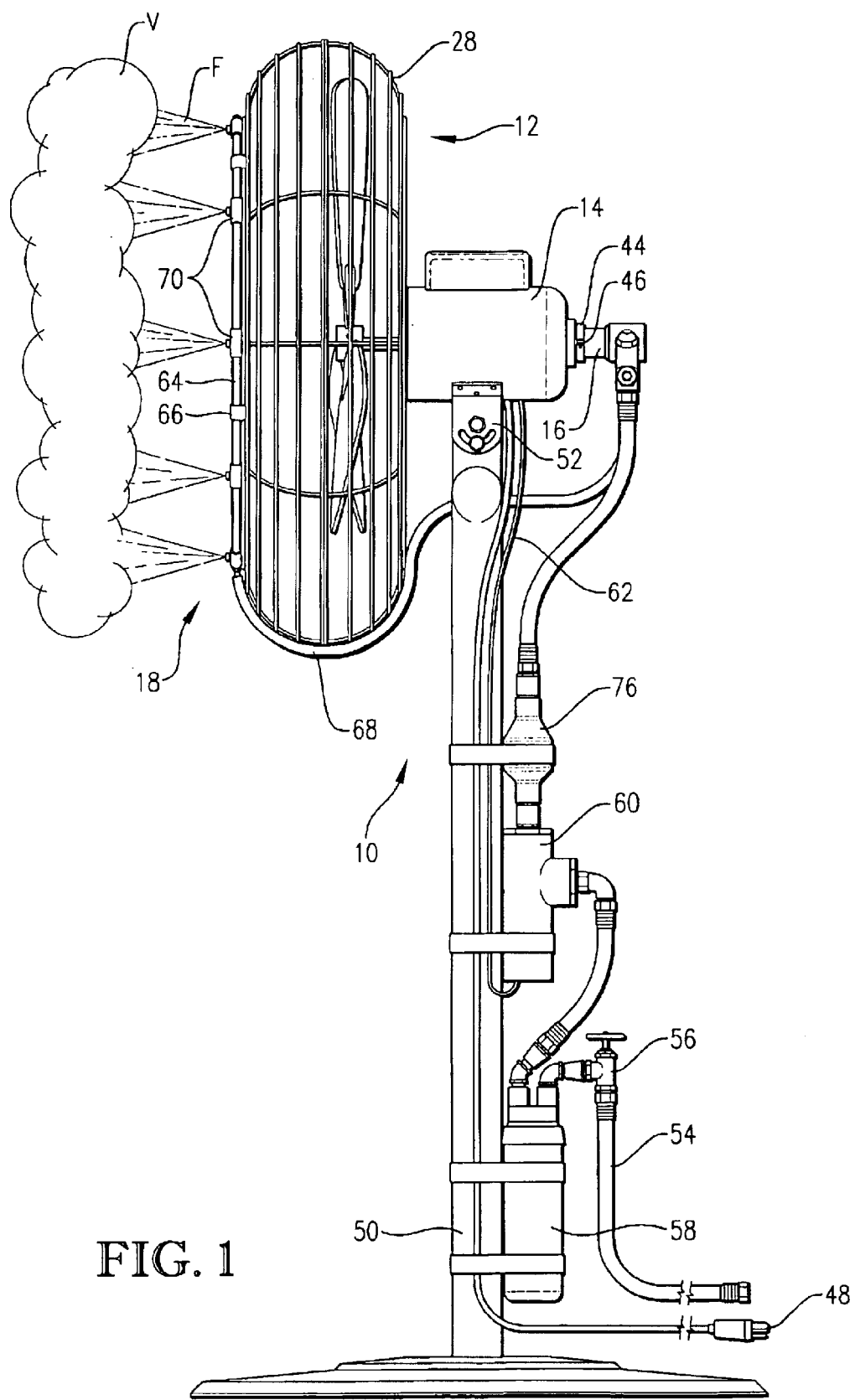
FIG. 1 is a side elevational view of a high-pressure misting fan constructed in accordance with the principles of a preferred embodiment of the present invention.

Referring initially to FIG. 1, a high-pressure misting fan 10 constructed in accordance with the principles of a preferred embodiment of the present invention is illustrated. The misting fan 10 is configured for injecting a fluid F into a generated stream of air that induces evaporation of the fluid F. A vapor impregnated airstream V is then forced into an environment to cool people located therein as well as the ambient atmosphere (e.g., workers in an industrial setting, etc.). The illustrated misting fan 10 is adapted to be connected to a fluid source of tap water (not shown), however, any suitable source of fluid providing the desired cooling effects could be utilized. The high-pressure misting fan 10 broadly includes a rotatable propeller 12, a motor 14, a pump 16, and a nozzle assembly 18.

The rotatable propeller 12 generates the airstream when rotated. In more detail, the propeller 12 includes a hub 20 and pitched blades 22, 24, and 26 fixed to the hub 20 (see FIG. 2). Those skilled in the art will appreciate that the propeller 12 is a standard air circulator. One suitable propeller is a thirty (30) inch propeller with tilted blades available from Revcor of Carpentersville, Ill., as model number GT3002-15. For purposes that will be subsequently described, the illustrated propeller 12 differs from a traditional configuration in that the blades 22, 24, and 26 have a reverse pitch. It is within the ambit of the present invention to utilize any suitable propeller to generate the desired airstream.

The propeller 12 is enclosed in a cage 28. The illustrated cage 28 is a wire cage having a generally doughnut-shaped configuration that presents a front surface and an axially spaced rear surface. The cage 28 is coupled at its rear surface to the motor 14 (e.g., by bolts, screws, etc.). The misting fan 10 preferably includes the cage 28 to enhance safe use as well as to facilitate mounting the nozzle assembly 18 (as will be described in detail below), however, it is within the ambit of the present invention to utilize a configuration that does not include a cage.

The propeller 12 is drivingly connected to the motor 14. Particularly, the motor 14 includes a drive shaft 30 presenting axially spaced opposite ends 32 and 34. The end 32 of the drive shaft 30 extends through the rear surface of the cage 28 to drivingly connect with the hub 20 of the propeller 12 (see FIGS. 1 and 2).

Figure 2:
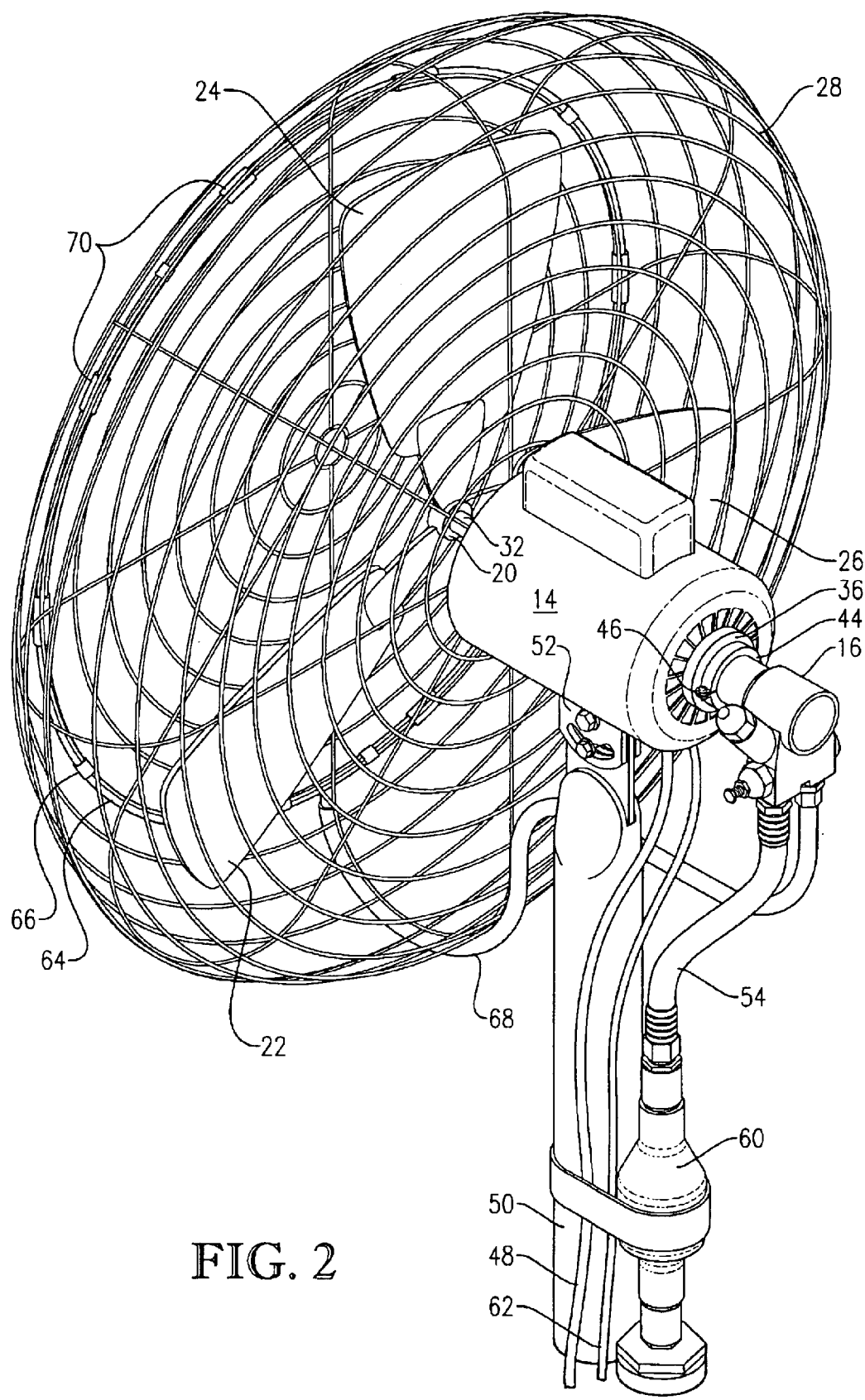
FIG. 2 is an enlarged fragmentary perspective view of the fan illustrated in FIG. 1.
Figure 4:
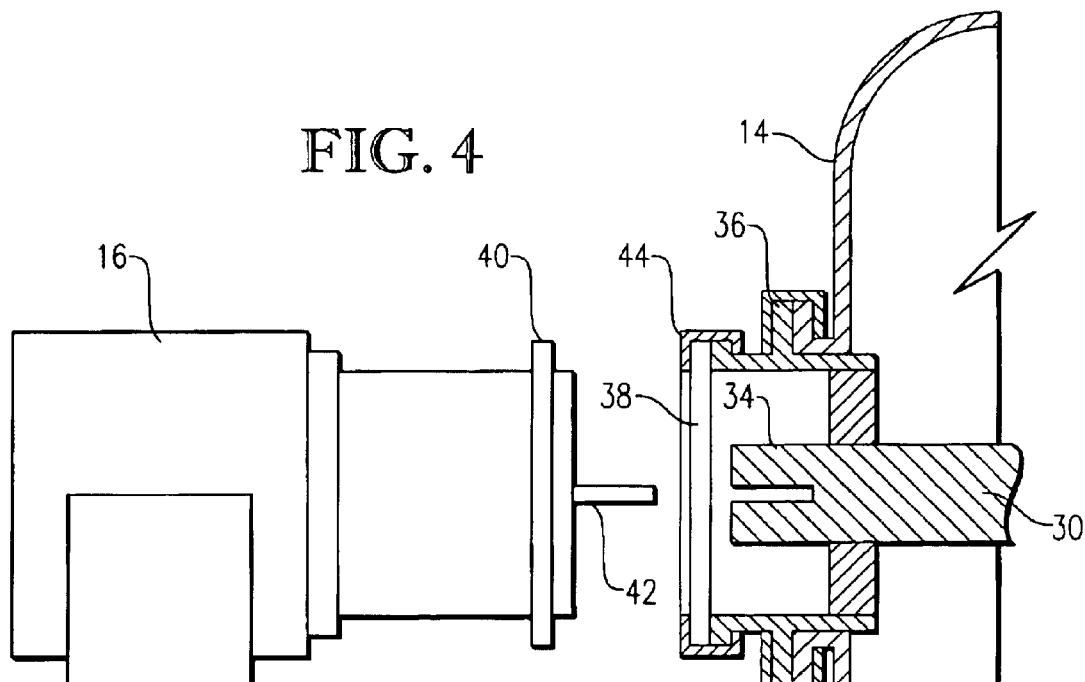
FIG. 4 is an enlarged partial side assembly view of the fan with the motor shown in fragmentary cross-section to illustrate the coupling between the pump and the motor.
Figure 3:
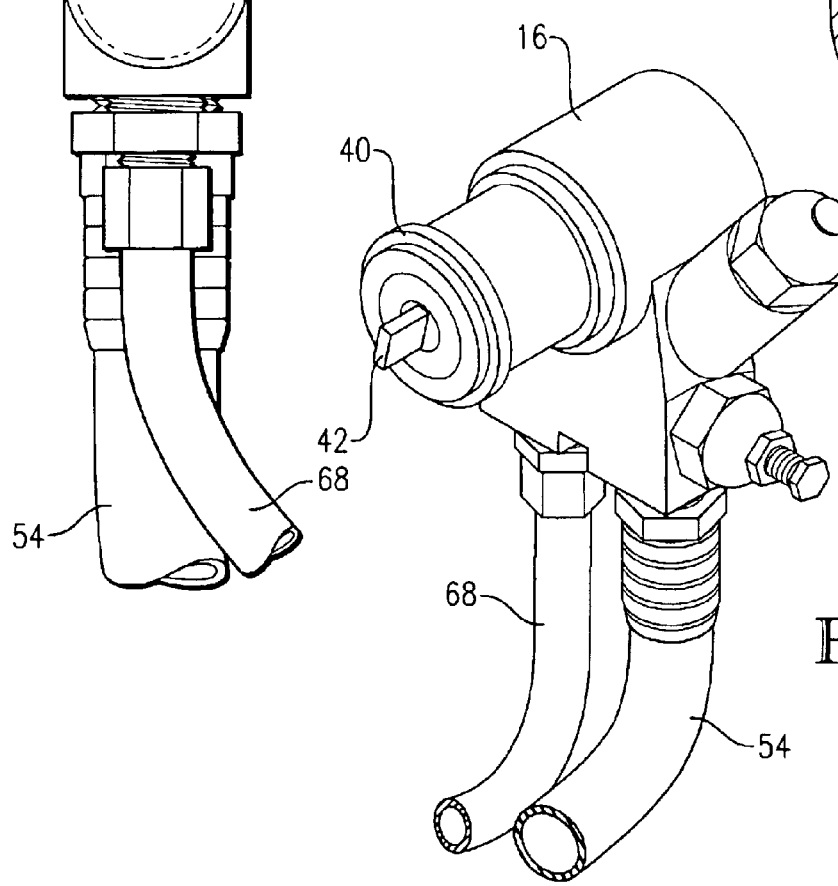
FIG. 3 is an enlarged partial perspective view of the fan with portions removed to illustrate the pump.

The motor 14 is drivingly connected to both the propeller 12 and to the pump 16 so that the motor 14 rotates the propeller 12 and operates the pump 16. As previously indicated, the hub 20 of the propeller 12 is drivingly coupled to the end 32 of the drive shaft 30. As shown in FIGS. 2–4, in the illustrated misting fan 10, the pump 16 is drivingly connected to the end 34 of the drive shaft 30. In more detail, a collar 36 is secured to the back of the motor 14 (e.g., with a clamp, threaded thereto, welded thereto, etc.). The collar 36 is grooved with a channel 38 for complementally receiving the pump 16 (see FIG. 4). The pump end 34 of the shaft 30 extends into the collar 36. The end 34 of the shaft 30 is slotted to complementally receive a driving component of the pump 16. The end of the pump 16 that is received in the collar 36 includes a flange 40 configured to be complementally received in the channel 38. The driving component of the pump 16 is keyed with a key 42 configured to be complementally received in the slotted end 34 of the drive shaft 30. When the flange 40 is received in the channel 38 and the key 42 is received in the slotted end 34 of the shaft 30, a clamp 44 is secured around the flange 40 and the collar 36. The clamp 44 is tightened by a screw 46 (see FIGS. 1 and 2) to securely retain the pump 16 in driving connection with the motor 14. In this manner, when the motor 14 rotates the drive shaft 30, the propeller 12 is rotated and the pump 16 is operated.

The motor 14 is configured to rotate the drive shaft 30 at a sufficient rpm to enable the propeller 12 to provide the desired airstream as well as enable the pump 16 to sufficiently pressurize the fluid and deliver it to the nozzle assembly 18 for injection into the airstream. The illustrated motor 14 is an electric motor and accordingly includes a power cord 48 for connecting the motor 14 to a suitable power source (e.g., 115/230 VAC, etc.). The motor 14 preferably is capable of operating in excess of 1,000 rpm. One such suitable motor is available from Emerson Motor Products, St. Louis, Mo., as model number S63CXSME-7011. As described above, the illustrated motor 14 is a dual ended, single shafted motor, however, it is within the ambit of the present invention to utilize various alternative motor configurations. For example, the motor could be configured to drive dual shafts, one shaft for each of the propeller and the pump. It is important, however, that the propeller and the pump be driven by a single motor.

The motor 14 is supported on a base 50. The base 50 is a traditional pedestal base. The motor 14 is adjustably coupled to the base 50 by a bracket assembly 52. Although the illustrated misting fan 10 is non-oscillating, it is within the ambit of the present invention to utilize an oscillating support for the motor 14. It is also within the ambit of the present invention to utilize various alternative configurations for the base as well as eliminating the base altogether (e.g., mounting the motor in a wall, etc.).

The pump 16 is fluidly disposed upstream from the nozzle assembly 18 and is operable to pressurize the fluid F flowing from the fluid source to the nozzle assembly 18. Particularly, the pump 16 is preferably a low flow and high-pressure pump (e.g., less than 1 GPM at 500–1,000 psi). The illustrated pump 16 is a rotary vane type pump that is rotated by the drive shaft 30 of the motor 14 as previously described. As previously indicated, the motor 14 rotates a single drive shaft 30 to rotate and operate both the propeller 12 and the pump 16. The illustrated motor 14 rotates in a counter-clockwise direction when viewed as shown in FIG. 2. The reverse pitch of the blades 22, 24, 26 as previously described cooperates with the counter-clockwise rotation of the motor 14 to direct the generated airstream out of the front of the cage 28 as illustrated in FIG. 1. This configuration further allows for the use of an off-the-shelf pump for the pump 16. One such suitable pump is available under the designation "TEEL" as model number 4RM64, available from Grainger, Chicago, Ill. It is within the ambit of the present invention to utilize various alternative configurations for the pump, however, it is important that the propeller and the pump be driven by a common motor.

The pump 16 is fluidly connected to the power source by a plurality of segments of a supply line 54 (see FIG. 1). The illustrated supply line 54 is formed from hosing (e.g., a traditional garden hose, etc.) with threadable couplings at the attachment ends of each of the sections. The illustrated supply line 54 includes a shut-off valve 56 interposed between the pump 16 and the fluid source for selectively terminating the supply of fluid to the pump 16.

As previously indicated, the fluid source (not shown) for the illustrated misting fan 10 is a source of standard tap water. It is preferable to filter the tap water prior to introducing the tap water into the pump. Accordingly, the illustrated misting fan 10 includes a filter 58 positioned upstream from the pump 16 and operable to filter the fluid F flowing from the fluid source to the pump 16 (see FIG. 1). The filter 58 preferably has a micron rating of at least about ten so as to reduce the particles in the tap water that may be undesirable for the pump and the nozzle assembly (e.g., rust, dirt, clay, iron sediment, etc.). The illustrated filter 58 is a polypropylene/styrene filter. One such suitable filter is available from the McMaster Corporation of Chicago, Ill., as part numbers 5170K77 and 45175K4.

In order to avoid potential damage to the pump 16 (e.g., cavitation, etc.), the misting fan 10 preferably includes components (e.g., a pressure sensor, a flow meter, a clutch, etc.) to vary operation of the pump in response to undesirably low fluid pressure at the pump head. Accordingly, the illustrated misting fan 10 includes a flow meter 60 that is in power communication with the motor 14 and located upstream of the pump 16. The flow meter 60 varies operation of the pump 16 relative to the flow of the fluid F from the fluid source to the pump 16 (see FIG. 1). In more detail, the illustrated flow meter 60 reads the existence of the flow of the fluid F being supplied to the pump 16. In this regard, the flow meter 60 is upstream from the pump 16 and downstream from both the fluid source and the filter 58. The flow meter 60 is in fluid communication with the pump 16 by the supply line 54. When the flow of the fluid F to the pump 16 is nonexistent, the flow meter 60 sends an input signal to the motor 14 that causes the motor 14 to power off. The flow meter 60 is in power communication with the motor 14 by a cable 62.

It is within the ambit of the present invention to utilize various configurations to control the supply of fluid to the pump. For example, the pump could include a clutch geared off of the drive shaft and a pressure sensor or flow meter could be utilized to control gearing up or down the pump relative to the pressure of the fluid flowing to the pump. Additionally, the fan could a primer to prime the pump. However, it is important that the pump be configured to be operated by the same motor that rotates the propeller and that the pump be operable to sufficiently pressurize the fluid flowing to the nozzle assembly.

As shown in FIGS. 1, 2, and 5, the illustrated nozzle assembly 18 is positioned downstream of both the pump 16 and the propeller 12 and is operable to inject pressurized fluid F into the airstream generated by the propeller 12 to result in the vapor-impregnated airstream V. Particularly, the nozzle assembly 18 includes a ring 64 coupled to the front surface of the cage 28 by a plurality of clips 66 so as to be downstream of the propeller 12. The ring 64 is in fluid communication with the pump 16 by an outlet feed line 68. The ring 64 and the feed line 68 are positioned downstream from the pump 16 and accordingly receive fluid F that has been pressurized by the pump 16. In this regard, the ring 64 and the feed line 68 must be formed of a material able to handle the pressurized fluid (e.g., 500–1,000 psi) (e.g., formed of a high-pressure plastic, metal, etc.). One suitable example of such a material is a high pressure plastic tubing available as part numbers 102285 (ring) and 102291 (feed line) from TekSupply of Dyersville, Iowa.

The ring 64 of the nozzle assembly 18 further includes a plurality of nozzles 70 spaced around the ring 64. Each of the nozzles 70 includes opposing male coupling members 72 and 74 (see FIG. 5). In this manner, for assembly purposes, the ring 64 can be separated at the desired nozzle location and one of the nozzles 70 can be inserted therein in sealing engagement. The coupling members 72, 74 are configured to sealingly engage the inside diameter of the ring 64 and thereby retain the ring 64 in sealing engagement with the nozzle 70. Each of the nozzles 70 includes a fluid-distributing aperture 76 in fluid communication with the ring 64. In the illustrated nozzle assembly 18, the aperture 76 is formed in the end of a rotatable valve member 78 and is therefore spaced from the ring 64 (see FIG. 5). In one manner known in the art, the valve member 78 is threadably received in a nozzle housing 80. In this manner, the amount of fluid delivered through the aperture 76 is adjustable. Particularly, the fluid F flowing through the ring 64 flows through one of the coupling members 72, 74 and into the nozzle housing 80 where it contacts the valve member 78. The valve member 78 can be rotated in either direction, thereby causing the valve member 78 to thread further in or further out of the housing 80 depending on the direction the valve member 78 is rotated. As the valve member 78 is threaded further out of the housing 80 a larger quantity of the fluid F is delivered through the aperture 76 and correspondingly when the valve member 78 is threaded further into the housing 80 a smaller quantity of the fluid F is delivered through the aperture 76. Each of the adjustable nozzles 70 is preferably adjustable to the equivalent of at least as small as a 0.008 diameter aperture in the ring 64. One such suitable nozzle is available as part number 102265 from TekSupply of Dyersville, Iowa.

Operation

In operation, the misting fan 10 is connected to the fluid source (not shown) and an electrical power source (not shown). The fluid F flows through the supply line 54 through the filter 58 and through the flow meter 60 to the pump 16. The motor 14 rotates the drive shaft 30 to operate the pump 16. The pump 16 pressurizes the fluid F and delivers it through the feed line 68 to the nozzle assembly 18. The motor-rotated drive shaft 30 simultaneously rotates the propeller 12 to generate the forced airstream. The nozzles 70 of the assembly 18 inject the pressurized fluid F into the airstream to create the vapor impregnated airstream V. The airstream V is then forced into the environment to provide the desired evaporative cooling of the environment.

It is within the ambit of the present invention to utilize various alternative forms of operation of the misting fan 10. For example, although not preferred, the propeller 12 can be utilized as a standard air circulator by simply disconnecting the supply line 54 from the fluid source or turning off the shutoff valve 56.

The preferred forms of the invention described above are to be used as illustration only, and should not be used in a limiting sense to interpret the scope of the present invention. Obvious modifications to the exemplary embodiments, set forth above, could be readily made by those skilled in the art without departing from the spirit of the present invention.

The inventors hereby state their intent to rely on the Doctrine of Equivalents to determine and assess the reasonably fair scope of the present invention as pertains to any apparatus not materially departing from but outside the literal scope of the invention as set forth in the following claims.

What is claimed is:

1. A misting fan comprising:

a rotatable propeller for generating an airstream when rotated;

a nozzle assembly fluidly connectable to a fluid source and operable to inject fluid into the airstream;

a pump fluidly disposed upstream from the nozzle assembly and operable to pressurize fluid flowing from the fluid source to the nozzle assembly;

a cage configured to shield a person within the airstream from the propeller, said cage comprising an open framework that substantially surrounds the propeller, with at least part of the framework being located between the propeller and the nozzle assembly; and a single motor that rotates the propeller and operates the pump, said motor including a rotatable drive shaft presenting first and second ends, said first end of the drive shaft being drivingly connected to the propeller, said second end of the drive shaft being drivingly connected to the pump.

2. The fan as claimed in claim 1, said nozzle assembly including a ring downstream from the propeller.

3. The fan as claimed in claim 2, said ring including at least one nozzle.

4. The fan as claimed in claim 3, said nozzle including an aperture formed in the ring.

5. The fan as claimed in claim 3, said ring including a plurality of nozzles spaced around the ring.

6. The fan as claimed in claim 3, said ring being coupled to the cage.

7. The fan as claimed in claim 1; and a filter upstream from the pump and operable to filter fluid flowing from the fluid source to the pump.

8. The fan as claimed in claim 1, said first and second ends of the drive shaft being axially spaced opposite ends.

9. The fan as claimed in claim 8, said propeller including a hub fixed to the first end of the drive shaft.

10. The fan as claimed in claim 8, said pump including an impeller fixed to the second end of the drive shaft.

11. A fan comprising:

a rotatable propeller for generating an airstream when rotated;

a nozzle assembly fluidly connectable to a fluid source and operable to inject fluid into the airstream;

a pump fluidly disposed upstream from the nozzle assembly and operable to pressurize fluid flowing from the fluid source to the nozzle assembly; and a single motor drivingly connected to the propeller and pump so that the single motor rotates the propeller and operates the pump, said nozzle assembly including a ring downstream from the propeller, said ring including at least one nozzle, said nozzle being adjustable so as to vary the quantity of fluid injected into the airstream.

12. A fan comprising:

a rotatable propeller for generating an airstream when rotated;

a nozzle assembly fluidly connectable to a fluid source and operable to inject fluid into the airstream;

a pump fluidly disposed upstream from the nozzle assembly and operable to pressurize fluid flowing from the fluid source to the nozzle assembly; and a single motor drivingly connected to the propeller and pump so that the single motor rotates the propeller and operates the pump, a flow meter in power communication with the motor and operable to vary operation of the pump relative to the pressure of fluid flowing from the fluid source to the pump.

13. A fan comprising:

a rotatable propeller for generating an airstream when rotated;

a nozzle assembly fluidly connectable to a fluid source and operable to inject fluid into the airstream;

a pump fluidly disposed upstream from the nozzle assembly and operable to pressurize fluid flowing from the fluid source to the nozzle assembly; and a motor including a rotatable drive shaft presenting first and second ends, said first end of the drive shaft being drivingly connected to the propeller, said second end of the drive shaft being drivingly connected to the pump, said nozzle assembly including a ring downstream from the propeller, said ring including at least one nozzle, said nozzle being adjustable so as to vary the quantity of fluid injected into the airstream.

14. A fan comprising:

a rotatable propeller for generating an airstream when rotated;

a nozzle assembly fluidly connectable to a fluid source and operable to inject fluid into the airstream;

a pump fluidly disposed upstream from the nozzle assembly and operable to pressurize fluid flowing from the fluid source to the nozzle assembly;

a motor including a rotatable drive shaft presenting first and second ends, said first end of the drive shaft being drivingly connected to the propeller, said second end of the drive shaft being drivingly connected to the pump; and a flow meter in power communication with the motor and operable to vary operation of the pump relative to the pressure of fluid flowing from the fluid source to the pump.

\* \* \* \* \*